Patented Nov. 1, 1949

2,486,926

UNITED STATES PATENT OFFICE

2,486,926

PRODUCTION OF PHENOLIC ETHERS OF POLYHYDRIC ALCOHOLS

Michael Francis Carroll and Ronald George Mason, London, England

No Drawing. Application June 2, 1948, Serial No. 30,724. In Great Britain June 5, 1947

6 Claims. (Cl. 260—613)

1

This invention relates to the manufacture of phenolic glyceryl ethers by the direct condensation of a phenol with glycerol and is a development of the process (hereinafter referred to as the parent process) described and claimed in the co-pending application of Michael F. Carroll, Serial No. 611,266, now abandoned, and in his application Serial No. 30,725 filed June 2, 1948.

According to the parent process the production of mono-phenolic glyceryl ethers comprises the direct condensation in the presence of a catalyst of glycerol with phenol or a cresol, or any mixtures thereof, the relative proportions of the glycerol and the phenolic reagent being such that the phenolic reagent is present in excess of an equi-molecular proportion of the glycerol, the relative molecular proportions varying from 1.4:1 to 2.0:1, the said condensation reaction being concluded while the resulting product of mixed phenolic glyceryl ethers contains the mono-ether in predominating proportion in parts by weight over the di-ether.

As explained in the specification of the co-pending application, the process is not restricted to any specific method of promoting the condensation reaction, being based upon the discovery that under otherwise comparative conditions, provided the phenolic reagent is present in an excess as referred to, and particularly if the conditions in this respect are such that initially and throughout at least the greater part of the condensation reaction, the unconsumed phenolic reagent is present in the liquid mixture in higher proportion than is the unconsumed glycerol, a marked improvement in the resulting percentage conversion of glycerol into a mixture of mono- and di-ethers is obtainable in the reaction, and also a higher ratio of mono-ether to di-ether. Moreover, under suitably controlled conditions, indicated in the specification, a commercially pure mono-phenolic glyceryl ether is readily obtainable and capable of isolation.

A preferred catalyst for use in the process is sodium acetate, since this particular catalyst fulfills the essential conditions for the purposes of the process, of being soluble in gylcerol under anhydrous conditions and of being stable under the temperature conditions of the condensation reaction; also it is freely soluble in water, thus facilitating post-condensation recovery. Other catalysts capable of promoting condensation reactions involving the elimination of water may, however, be used as, for example, potassium acetate and other water soluble alkali metal salts of the lower (non-soap) saturated aliphatic acids.

2

It has now been found that the parent process is applicable also to the production of phenolic glyceryl ethers from homologues of phenol, other than cresol, in particular the xylenols and certain other homologues as hereinafter specified, provided the homologue employed is one which is soluble in glycerol under the conditions of the reaction, and reaction conditions are established and maintained in the process which are comparable to those which obtain when, as in the parent process, the phenolic reagent employed is phenol or cresol, as by the employment of an entraining agent (e. g. xylene) additional to any portion of the excess of phenolic reagent that may act as an entraining agent, in the manner described in the co-pending application with reference to phenol and cresol, which expedient may, however, with some homologues be dispensed with, although even with these homologues it will generally facilitate the reaction, enabling the same to be carried further, and/or, in the event of the phenolic reagent being one which has such a high boiling point that it is otherwise difficult or impossible to maintain the preferred temperature for the reaction, of 200–250° C., by conducting the reaction under conditions of reduced pressure.

According to the present invention, therefore, a process for the production of mono-phenolic glyceryl ethers, said process being a development of the parent process, comprises the condensation in the presence of a catalyst of glycerol with a phenolic reagent consisting at least in part of a homologue of phenol other than cresol, the phenolic reagent being soluble in glycerol under the conditions of the reaction, the relative proportions used of the glycerol and the phenolic reagent for the ensuing condensation reaction being such that the phenolic reagent is present in excess of an equi-molecular proportion of the glycerol and the said condensation reaction being concluded while the resulting product of phenyl glyceryl ethers contains the mono-ether in predominating proportion in parts by weight over the di-ether. Broadly speaking, therefore, the conditions for the condensation reaction in the process of this invention are essentially the same as those which are used when in accordance with the parent process the phenolic reagent is phenol or cresol.

Homologues of phenol as above referred to, capable of use in the process of the present invention, include mono-substituted alkyl phenols in which the alkyl group is higher than $CH_3$, for example, isopropyl phenol and synthesized phenols such as para tertiary butyl phenol; di-substituted phenols, including xylenols boiling between 207 and 230° C., and other comparatively short chain di-substituted alkyl phenols with the same or different alkyl groups, and the coal tar phenols (tar acids) boiling between 230 and 260° C.

We have found that for the purposes of a satisfactory yield, the phenol homologue employed should conform to the following requirements:

(1) It should be soluble, at least to a substantial extent, in a mixture of glycerol with the catalyst (e. g. sodium acetate) employed, at the temperature of the reaction. If it is not so soluble, a two phase system will result, one layer consisting substantially of the phenol homologue and the other of the glycerol catalyst mixture, and the undesirable formation of polyglycerols will be favoured, since owing to heterogeneity of the mixture the conditions necessary for favouring mono-ether formation (namely an excess of the phenolic reagent) will be largely absent.

(2) It should not be substituted in the ortho position by heavy alkyl groups, as such substitution reduces the reaction rate, owing to steric hindrance with the result that polyglycerol formation is again favoured at the expense of the formation of the mono-phenyl glyceryl ethers.

As illustrative of the foregoing it may be remarked that para tertiary amyl phenol reacts satisfactorily, para octyl phenol somewhat less so and para octyl cresol is almost unreactive.

Obviously, mixtures of homologues which conform to requirement 1 can be used even though some of the constituents may be insoluble in the pure state.

Also the phenolic reagent in the process may be a mixture of phenol, or cresol, with a phenol homologue as referred to. For example it may be a technical mixture of $a$ cresols and $b$ xylenols, in approximately equal proportions.

The additional entraining agent should preferably be substantially immiscible with water and capable of forming an azeotrope therewith, its function being to carry off the water of reaction from the reaction sphere. It should further be non-reactive towards the phenolic and glycerol reagents and also towards the catalyst used, and it should have a lower boiling point than the phenolic reagent. Suitable materials for the purpose are, for example, xylene (already mentioned), toluene, benzene and petroleum fractions having a boiling range of from 60° to 140° C.

The process according to the invention enables the resulting liquid mixture of reaction products to be easily resolved into two readily separable substantially immiscible layers composed respectively of solutions of $a$ the mono- and di-phenolic glyceryl ethers and unconsumed phenolic reagent and $b$ unconsumed glycerol, catalyst and any polyglycerols that may have been formed, by adding water and preferably also a hydrocarbon solvent to the mixture, agitating the resulting mass and then allowing the mass to settle and stratify. The stratification layer composed of solution $a$ may then be subjected to distillation for isolation of the ethers contained in it and that composed of solution $b$ may be concentrated and returned to the process. The hydrocarbon solvent used in the foregoing procedure should be one such as benzene, xylene or toluene, having a boiling point within a range of about 80–150° C.

As in the case of the parent process, the magnitude of the excess of the phenolic reagent is not critical, but an excess of the order of 40–100% has been found to give good results.

The nature of the invention and the manner in which it may be carried into effect will now be further described with reference to the following specific examples, in which the stated parts are by weight:

*Example I*

The xylenol fraction from coal tar (boiling range 210–225° C.) was reacted with glycerol in the presence of sodium acetate as catalyst to produce xylenyl glyceryl ethers, the conditions of the condensation reaction being similar to those in the parent process, as given in the specification of the co-pending application, except that allowance was made, as regards relative proportions of the reagents, for the difference in molecular weight as between the cresol used in those examples and the xylenol mixture used in the present examples and, where necessary, xylene entrainant was used to remove the water of reaction and maintain the temperature within the defined limits. The resulting crude material was worked up as in the parent process, with isolation of the xylenyl glyceryl ethers which had been produced, and the unconsumed reagents being returned to the process. The yield obtained was similar to the yields of cresyl glyceryl ethers obtained in the process of the co-pending application.

*Example II*

1:3:5 xylenol was reacted with glycerol in the presence of sodium acetate as catalyst to produce 1:3:5 xylenyl glyceryl ethers, in the following manner:

92 parts of glycerol (1 mol.), 220 parts of 1:3:5 xylenol (1.8 mol.) and 18 parts of sodium acetate (.22 mol.) were charged to a reaction vessel fitted with a short column leading to a condenser and decanter. The mixture was heated and xylene entrainant added in such a manner that xylene and the water of reaction continuously distilled as an azeotrope to the condenser and decanter, and the temperature in the reaction vessel was maintanied at 205–215° C. The water and xylene separated in the decanter, the xylene being returned to the system. After 10 hours the vessel was cooled and the crude material worked up as in Example 1, whereby 120 parts (.61 mol.) of mono- 1:3:5 xylenyl glyceryl ether were produced, together with 27 parts (.09 mol.) of di- 1:3:5 xylenyl gylceryl ether, the unconsumed reagents being returned to the process as before.

Attempts to repeat the results in this example without the use of an additional entrainant resulted in relatively small yields only.

*Example III*

Para tertriary butyl phenol formed by condensation of iso butylene with phenol, was reacted with glycerol in the presence of sodium acetate as catalyst to produce para tertiary butyl phenyl glyceryl ethers, in the following manner:

92 parts of glycerol (1 mol.), 300 parts of para tertiary butyl phenol (2 mols.) and 18 parts of sodium acetate were charged to a reaction vessel and heated in the presence of xylene entrainant as in Example II, except that the temperature in the reaction vessel was maintained at 215–225° C. After 8 hours the vessel was cooled and the crude material worked up as in the previous examples, 126 parts (.56 mol.) of mono-para tertiary butyl phenyl glyceryl ether and 36 parts (.1 mol.) of a di-para tertiary butyl phenyl glyceryl ether were produced and the unconsumed reagents returned to the process.

*Example IV*

The phenolic coal tar fraction (high boiling tar acids) (boiling range 230-260° C.) was reacted with glycerol in the presence of sodium acetate as catalyst as in Example I, allowance being made for the difference in molecular weight of the phenol homologue used as compared with that in Example I. Similar yields of phenolic glyceryl ethers resulted.

*Example V*

Para tertiary amyl phenol was reacted with glycerol in the presence of sodium acetate as catalyst to form para tertiary amyl phenyl glyceryl ethers, as in Example II, allowance being made for the difference in molecular weight of the phenol homologue used as compared with that in Example II. Similar yields of mono- and di-para tertiary amyl phenyl glyceryl ethers resulted.

What we claim as our invention and desire to secure by Letters Patent of the United States of America is:

1. In the process for the production of mono-phenolic glyceryl ethers by condensation of glycerol with a monohydric phenol having at least 8 carbon atoms in the presence of a catalyst which is a water-soluble alkali metal salt of a lower saturated fatty acid, relative molecular proportions of said phenol to said glycerol ranging from 1.4:1 to 2.0:1 and said condensation reaction being concluded while the resulting product of mixed mono- and di-phenolic glyceryl ethers contains the mono-ether in preponderating proportion, in parts by weight, relative to the di-ether, the improvement which comprises effecting the condensation in the presence of an entraining agent additional to any portion of the excess of said monohydric phenol that may act as an entraining agent to promote the removal of water of reaction from the reaction sphere, said entraining agent being substantially water-immiscible, capable of forming an azeotrope with water, and inert towards said glycerol, said phenol and said catalyst, and having a lower boiling point than said phenol.

2. Process for the production of mono-phenolic glyceryl ethers which comprises heating glycerol in admixture with a monohydric phenol having at least 8 carbon atoms, the glycerol and phenol being used in relative molecular proportions of 1.4:1 to 2.0:1, phenol to glycerol, in the presence of (1) an alkali metal acetate as condensation cataylst and (2) an entraining agent additional to any portion of the excess of said phenol that may act as an entraining agent to promote the removal of water of reaction from the reaction sphere, said entraining agent being substantially water-immiscible, capable of forming an azeotrope with water and inert toward said glycerol, said phenol and said catalyst, and having a lower boiling point than said phenol, concluding the ensuing condensation reaction while the resulting product of phenolic glyceryl ethers contains the mono-ether in preponderating proportion, in parts by weight, relative to the di-ether, and thereafter resolving the reaction product mixture resolved into two separable layers composed respectively of solutions of *a* the phenolic glyceryl ethers and unconsumed phenol and *b* unconsumed glycerol and catalyst, separating the layers and recovering mono-ethers from the layer *a*.

3. Process as in claim 2 wherein the entraining agent is an aromatic hydrocarbon of the benzene series.

4. Process as in claim 2 wherein the phenol is xylenol.

5. Process as in claim 2 wherein the phenol is p-tertiary butyl phenol.

6. Process as in claim 2 wherein the phenol is p-tertiary amyl phenol.

MICHAEL FRANCIS CARROLL.
RONALD GEORGE MASON.

REFERENCES CITED

The following references are of record in the file of this patent:

UNITED STATES PATENTS

| Number | Name | Date |
|---|---|---|
| 1,193,951 | Laszloffy | Aug. 8, 1916 |
| 2,303,582 | Russell et al. | Dec. 1, 1942 |
| 2,316,719 | Russell | Apr. 13, 1943 |

OTHER REFERENCES

Zivkovic, Monatschefte fur Chemie 29, 952-8 (1908).